US012798645B2

(12) United States Patent
Lin

(10) Patent No.: US 12,798,645 B2
(45) Date of Patent: Nov. 17, 2026

(54) FRAME AND TROLLEY

(71) Applicant: Ji Lin, Ningbo (CN)

(72) Inventor: Ji Lin, Ningbo (CN)

( * ) Notice: Subject to any disclaimer, the term of this patent is extended or adjusted under 35 U.S.C. 154(b) by 166 days.

(21) Appl. No.: 18/868,224

(22) PCT Filed: Aug. 22, 2023

(86) PCT No.: PCT/CN2023/114185
§ 371 (c)(1),
(2) Date: Nov. 22, 2024

(87) PCT Pub. No.: WO2024/066807
PCT Pub. Date: Apr. 4, 2024

(65) Prior Publication Data
US 2025/0333089 A1 Oct. 30, 2025

(30) Foreign Application Priority Data
Sep. 30, 2022 (CN) ......................... 202211214746.3
Sep. 30, 2022 (CN) ......................... 202222612490.3

(51) Int. Cl.
*B62B 3/02* (2006.01)

(52) U.S. Cl.
CPC ..................................... *B62B 3/02* (2013.01)

(58) Field of Classification Search
CPC ............ B62B 3/02; B62B 3/025; B62B 3/027
See application file for complete search history.

(56) References Cited

U.S. PATENT DOCUMENTS 6,491,318 B1 * 12/2002 Galt .......................... B62B 3/02 280/42
8,011,686 B2 * 9/2011 Chen ....................... B62B 3/106 280/87.01

(Continued)

FOREIGN PATENT DOCUMENTS

CN 106428152 A 2/2017
CN 210478734 U 5/2020

(Continued)

OTHER PUBLICATIONS

International Search Report for PCT/CN2023/114185 mailed Nov. 16, 2023, ISA/CN.

(Continued)

*Primary Examiner* — Jeffrey J Restifo
(74) *Attorney, Agent, or Firm* — Yue (Robert) Xu; Apex Attorneys at Law, LLP

(57) ABSTRACT

A frame includes a central connector, the central connector is oppositely connected to bottom frame transverse pipes in the direction of side frame bodies, one end of each bottom frame transverse pipe is rotatably connected to the central connector, and the other end is rotatably connected to a side frame body; swing pipe connectors, the swing pipe connectors are arranged in the direction in which the central connector faces first folding assemblies; first swing pipes, one end of each first swing pipe is rotatably connected to the central connector, and the other end is rotatably connected to the swing pipe connector; and second swing pipes arranged by an angle, one end of each second swing pipe is rotatably connected to the swing pipe connector, and the other end of the second swing pipe is rotatably connected to a side vertical pipe.

20 Claims, 8 Drawing Sheets

(56) References Cited

U.S. PATENT DOCUMENTS

| | | | | |
|---|---|---|---|---|
| 9,073,564 | B2 * | 7/2015 | Yang | B62B 3/002 |
| 9,145,154 | B1 * | 9/2015 | Horowitz | B62B 5/0013 |
| 9,738,298 | B1 * | 8/2017 | Yang | B62B 3/025 |
| 10,040,470 | B1 * | 8/2018 | Horowitz | B62B 3/102 |
| 10,099,711 | B1 * | 10/2018 | Sun | B62B 3/007 |
| 10,099,712 | B1 * | 10/2018 | Sun | B62B 5/067 |
| 10,399,586 | B1 * | 9/2019 | Huang | B62B 5/06 |
| 10,633,010 | B1 * | 4/2020 | Zhang | B62B 3/025 |
| 10,836,418 | B2 * | 11/2020 | Zhu | B62B 3/025 |
| 10,953,903 | B1 * | 3/2021 | Park | B62B 3/007 |
| 10,953,904 | B1 * | 3/2021 | Sun | B62B 3/002 |
| 11,173,936 | B1 * | 11/2021 | Regev | B62B 3/108 |
| 11,332,178 | B2 * | 5/2022 | Yang | B62B 5/067 |
| 11,370,467 | B1 * | 6/2022 | Horowitz | B62B 3/007 |
| 11,685,416 | B2 * | 6/2023 | Yang | B62B 3/002<br>280/651 |
| 11,851,097 | B2 * | 12/2023 | Chu | B62B 5/067 |
| 11,932,298 | B2 * | 3/2024 | Sun | B62B 3/007 |
| 12,012,139 | B2 * | 6/2024 | Sun | B62B 3/007 |
| 12,128,940 | B2 * | 10/2024 | Sun | B62B 3/007 |
| D1,056,391 | S * | 12/2024 | Fang | D34/12 |
| D1,064,096 | S * | 2/2025 | Zhang | D34/12 |
| 12,263,876 | B1 * | 4/2025 | Zhu | B62B 3/025 |
| 12,304,544 | B2 * | 5/2025 | Conn | B62B 5/067 |
| 12,358,545 | B2 * | 7/2025 | Sun | B62B 3/007 |
| 12,434,752 | B2 * | 10/2025 | Zhou | B62B 3/007 |
| 12,515,726 | B2 * | 1/2026 | Zhang | B62B 3/007 |
| 12,515,727 | B2 * | 1/2026 | Zhang | B62B 3/02 |
| 2010/0090444 | A1 * | 4/2010 | Chen | B62B 3/106<br>280/651 |
| 2011/0204598 | A1 | 8/2011 | Stevenson | |
| 2021/0107548 | A1 * | 4/2021 | Wang | B62B 3/007 |
| 2021/0107549 | A1 * | 4/2021 | Wang | B62B 3/007 |
| 2024/0270298 | A1 * | 8/2024 | Song | B62B 5/067 |
| 2025/0018989 | A1 * | 1/2025 | Zhang | B62B 3/002 |
| 2025/0065934 | A1 * | 2/2025 | Zhang | B62B 3/007 |
| 2025/0083726 | A1 * | 3/2025 | Sun | B62B 5/065 |
| 2025/0100606 | A1 * | 3/2025 | Fang | B62B 5/0013 |
| 2025/0249943 | A1 * | 8/2025 | Gao | B62B 3/025 |
| 2025/0388254 | A1 * | 12/2025 | Weng | B62B 3/007 |
| 2026/0021841 | A1 * | 1/2026 | Hu | B62B 3/007 |
| 2026/0054760 | A1 * | 2/2026 | Zhang | B62B 3/007 |
| 2026/0116445 | A1 * | 4/2026 | Sun | B62B 3/007 |
| 2026/0175889 | A1 * | 6/2026 | Yang | B62B 3/025 |

FOREIGN PATENT DOCUMENTS

| | | | |
|---|---|---|---|
| CN | 213502432 | U | 6/2021 |
| CN | 214985514 | U | 12/2021 |
| CN | 217227622 | U | 8/2022 |
| CN | 115447650 | A | 12/2022 |
| CN | 218258234 | U | 1/2023 |

OTHER PUBLICATIONS

Chinese First Office Action issued on Jul. 28, 2025 for Chinese priority application No. 202211214746.3.

* cited by examiner

FRAME AND TROLLEY

The present application is a National Phase entry of PCT Application No. PCT/CN2023/114185, filed on Aug. 22, 2023, which claims priorities to the following Chinese Patent applications, which are incorporated herein by reference in their entireties.

| Number | Filing date | Application number | title |
|---|---|---|---|
| 1 | 2022 Sep. 30 | 202211214746.3 | FRAME AND CART |
| 2 | 2022 Sep. 30 | 202222612490.3 | FRAME AND CART |

FIELD

The present application relates to the technical field of grocery vehicle, and in particular to a frame and a cart.

BACKGROUND

A cart is a kind of transport vehicle which is pushed and pulled manually, and it is an ancestor of all vehicles. With the development of technology, the cart may also be connected to motor vehicles to carry goods. In spite that cart goods-carrying technology is developing, the cart is still an indispensable handling tool up to now. The widespread use of the cart in industrial production and daily life attributes to its low cost, simple maintenance, easy operation, and light weight, which is very convenient for transporting lighter items in a short distance.

The cart has two lengths in two directions. A length in one direction is relatively great, and following two ways are generally adopted in order for achieving folding in this direction.

A first way is to lengthen the cross diagonal rods of the chassis for increasing the length of the cart in the left and right direction, so as to achieve an increased length of the cart in the left and right directions. Lengthening the cross diagonal rods of the chassis results in the vertical cross diagonal rods being greater than the vertical rods on the sides in the up and down direction after the cart being folded, which is not convenient for being stored. Moreover, lengthening the cross diagonal rods of the chassis lowers the stability of the bottom structure, resulting in a lower load capacity.

A second way is to parallel connect multiple sets of cross diagonal rods of the chassis for increasing the length of the cart in the left and right direction. Although this structure may unchange the length of the cart in the up and down direction after the cart being folded, the voids formed in the chassis are numerous and large, and the support effect is mediocre, resulting in a poor carrying capacity.

In view of this, how to provide a frame that is beneficial to carrying and easy to fold as well as a cart having such frame is a technical problem for those skilled in the art to urgently solve.

SUMMARY

An object of the present application is to overcome the shortcomings of the frame in the prior art in respect of load capacity and folding, and a frame and a cart are provided.

In the present application, the technical problems are solved by the following technical solutions.

A frame includes side frame bodies that are arranged in opposite, and a first folding assembly is connected between the side frame bodies, the side frame bodies each includes side vertical tubes that are arranged in opposite, and a second folding assembly is connected between the side vertical tubes, the frame further includes a bottom frame member includes:

a middle connector, which is connected to bottom frame transverse tubes in a direction of the side frame bodies, one end portion of each bottom frame transverse tube is rotatably connected to the middle connector, and the other end portion of each bottom frame transverse tube is rotatably connected to a corresponding one of the side frame bodies;

a linkage connector, which is located in a direction from the middle connector towards the first folding assembly;

a first linkage, one end portion of the first linkage is rotatably connected to the middle connector and the other end portion of the first linkage is connected to the linkage connector; and second linkages that are arranged at an angle, one end portion of each second linkage is rotatably connected to a corresponding one of the linkage connectors and the other end portion is rotatably connected to a corresponding one of the side vertical tubes.

A cart having the frame, in which wheels are provided on a lower side of the frame.

The advantages and positive effects of the present application are as follows.

1. In the present application, the middle connector is located at a middle line between the opposite side frame bodies, which provides a key support for the bottom of the frame. The bottom frame transverse tubes directly connect the middle connector and the side frame body. Compared with other movable connection ways, the connection structure is more stable, the load capacity of the frame is greater, and it is more beneficial to the folding of the side frame bodies. The linkage connector forms another support center on the basis of the middle connector, further increasing the support of the bottom frame member.
2. In the present application, the second linkage and the first linkage together implement a two-section connection way, and by cooperating with the linkage connector, a good driving effect between the second linkage, the first linkage and the middle connector can be achieved, making the bottom frame member easy to be folded. More importantly, through the cooperation of this structure, the direct rotation connection of the bottom frame transverse tube with the side frame body can be achieved, greatly improving the stability of the structure compared with other connection ways, and the users can obtain a good experience of easy folding in use.

Figure 1:
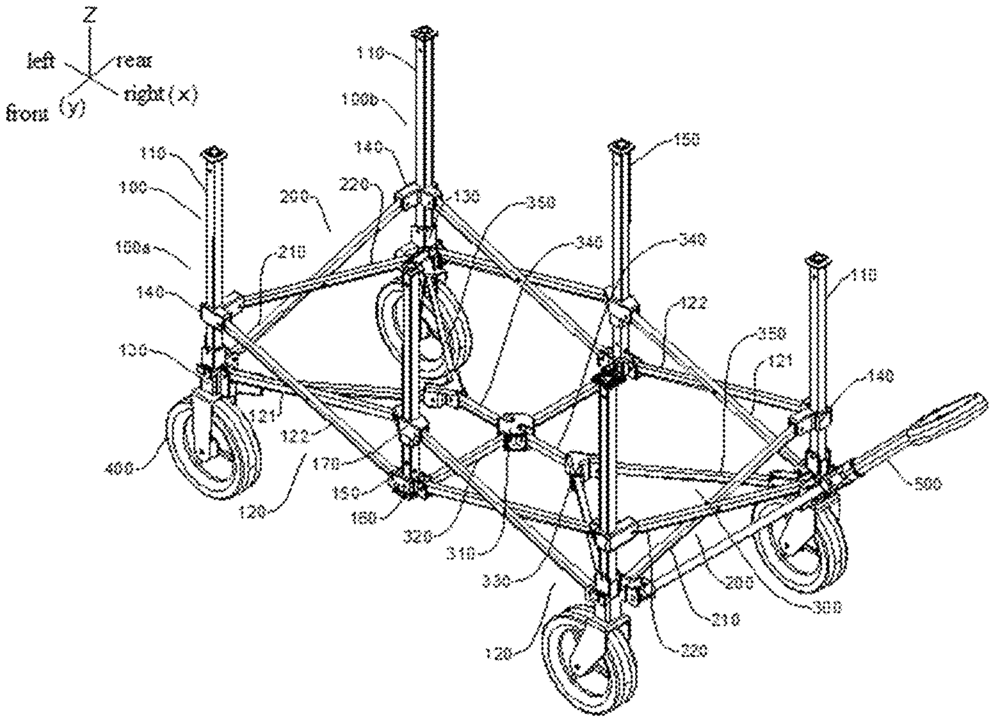
FIG. 1 is a schematic axonometrical structural view of the present application.

100 side frame body, 100*a* front side frame body, 100*b* rear side frame body, 110 side vertical tube, 120 second folding assembly, 121 first tube, 122 second tube, 130 side bottom frame member, 140 side slider, 150 middle vertical tube, 160 middle bottom frame member, 161, fixation portion, 1611 groove, 162 lug, 170 middle slider, 200 first folding assembly, 210 third tube, 220 fourth tube, 300 bottom frame member, 310 middle connector, 320 bottom frame transverse tube, 330 linkage connector, 340 first linkage, 350 second linkage, 400 wheel, 500 handle.

DETAILED DESCRIPTION OF THE EMBODIMENTS

The technical solutions in the embodiments of the present application will be clearly and completely described in conjunction with the accompanying drawings below. Apparently, the described embodiments are only a part of the embodiments of the present application, not all of them. Based on the embodiments of the present application, all other embodiments obtained by those skilled in the art without paying creative labor are within the scope of the present application.

It should be noted that when a component is referred to as "fixed to" another component, this component may be directly positioned on the another component or an intermediate component may be provided there between. When a component is regarded to "be connected" to another component, this component may be directly connected to the another component or an intermediate component may be provided there between at the same time. When a component is regarded to "be arranged on" another component, this component may be directly arranged on the another component or an intermediate component may be provided there between. The terms "vertical," "horizontal," "left," "right," and so on used in this article are for illustrative purposes only.

Unless otherwise defined, all technical and scientific terms used in this article have the same meanings as those commonly understood by those skilled in the art belonging to the present application. The terms used in this specification of the present application are only for the purpose of describing specific embodiments, which are not intended to limit the present application. The term "and/or" used in this article includes any and all combinations of one or more related listed items.

The following will further describe the embodiments of the present application in conjunction with the accompanying drawings.

Three directions x, y, and z are defined in a three-dimensional space. For a frame of a cart, an upper limit of a volume of the frame is determined by the directions x, y, and z. For the same height z, the longer the frame is in x and y directions, the larger the volume is. In existing technology, when the length in x direction is relatively greater compared with that in y direction, the bottom frame member 300 is generally adapted in two ways.

In a first way, when the length in x direction is required to be increased, the cross diagonal rods of the chassis are lengthened so as to adapt to the length of the chassis in the left and right direction. Although the first way is the simplest and most direct way, lengthening the cross diagonal rods of the chassis may cause their heights to be greater than the vertical rods on the sides in z direction after being folded (the diagonal rods of the chassis are vertical), which results in an increase of the overall size in z direction after being folded, thereby making the cart difficult for being stored. Meanwhile, the greater the length of the diagonal rods of the chassis is, the higher the stability and quality requirements for the overall connection structure is. Under the same production cost, the stability of the bottom structure of longer diagonal rods is lower, and the load capacity is lower.

In a second way, when the length in the left and right direction is required to be increased, the chassis adopts parallel connecting multiple sets of cross diagonal rods. Although this structure may not change the vertical length after being folded, a bottom frame member 300 and side frame bodies 100 cannot form a good and stable connection structure. Moreover, parallel connecting multiple sets of cross diagonal rods may result in numerous and large voids in the chassis, especially the support effect at the central area of the chassis (which is also the most commonly used area for users to place items) is mediocre, causing a poor carrying performance and an increased damage to a fabric connected to the frame.

In order to solve the above problems, a frame with higher structural stability, better load capacity, and more convenience for folding is provided, including: the side frame bodies 100 that are arranged in opposite. A first folding assembly 200 is connected between the side frame bodies 100. The first folding assembly 200 is connected to the side frame bodies 100 that are arranged in opposite in order to make the side frame bodies 100 be folded or connected in y direction. The side frame bodies 100 each includes side vertical tubes 110 that are arranged in opposite, and a second folding assembly 120 is connected between the side vertical tubes 110 to make the side frame bodies 100 be folded or connected in x direction. The frame further includes a bottom frame member 300, which is used to connect with the side frame bodies 100 to form the whole frame mainly for supporting.

The bottom frame member 300 includes:

a middle connector 310, which is located at a middle line between the two side frame bodies 100 to provide a support for the bottom of the frame. The middle connector 310 is connected to bottom frame transverse tubes 320 in a direction of the side frame bodies 100, respectively. One end portion of each bottom frame transverse tube 320 is rotatably connected to the middle connector 310, and the other end portion is rotatably connected to the side frame body 100. The bottom frame transverse tube 320 directly connects the middle connector 310 and the side frame body 100. Compared with other movable connection ways, this connection structure is more stable, the load capacity of the frame is greater, and it is more beneficial to folding the side frame body 100;

a linkage connector 330, which is located in a direction from the middle connector 310 towards the first folding assembly 200 and forms another support area besides the middle connector 310, further increasing the support effect of the bottom frame member 300;

a first linkage 340, one end portion of which is rotatably connected to the middle connector 310 and the other end portion of which is rotatably connected to the linkage connector 330, and the first linkage 340 implements a function of connection between the linkage connector 330 and the middle connector 310;

second linkages 350 that are arranged at an angle with each other, one end portion of each second linkage 350 is rotatably connected to the linkage connector 330 and the other end portion of each second linkage 350 is rotatably connected to the side vertical tube 110, a two-section connection way is obtained by the second linkages 350 and the first linkage 340. By cooperating with the linkage connector 330, a good driving effect between the second linkages 350, the first linkage 340, and the middle connector 310 can be achieved, making it easy for the bottom frame member 300 to be folded. More importantly, by this structure, a direct rotational connection between the bottom frame transverse tubes 320 and the side frame bodies 100 can be achieved, greatly improving the stability of the structure compared with other connection ways, and the users can obtain a good experience of easy folding in use.

Meanwhile, the second linkages 350, the first linkage 340, and the bottom frame transverse tubes 320 are connected and cooperated, and thus their lengths can be proportionally changed, thereby providing better support and folding effects when the length in x direction is greater compared with existing technologies. Moreover, it is possible to achieve an effect that the vertical size after being folded does not protrude beyond the upper and lower end portions of the vertical tube in case that the vertical tube (in z direction) is short. That is, in this solution, the variables of x, y, and z can be selected from a wider range, and the manufacturer can manufacture products of different specifications according to different situations.

On another aspect, the cooperation connection of the second linkages 350, the first linkage 340, and the bottom frame transverse tubes 320 results in a more reasonable arrangement, which can ensure a good support at the bottom and thus prolong the service life of the fabric connection the frame based on the above effect.

Each side frame body 100 includes a middle bottom frame member 160, and the opposite sides of the middle bottom frame member 160 are each rotatably connected to a second folding assembly 120. The bottom frame transverse tube 320 is rotatably connected to the middle bottom frame member 160. The connection in x direction is achieved by multiple sets of second folding assemblies 120, and the middle bottom frame member 160 is used to connect the second folding assemblies 120. The bottom frame transverse tube 320 is rotatably connected to the middle bottom frame member 160, so that the middle bottom frame member 160 is directly connected to both the second folding assembly 120 and the bottom frame transverse tube 320. Compared with other movable connection ways, in this solution, the stability is better and the folding operation is smooth.

The second linkage 350 and the first linkage 340 which are connected to the linkage connector 330 are rotated in the same direction. Correspondingly, the linkage connector is formed with a groove with an opening facing downward and sideward. The first linkage 340 and the bottom frame transverse tube 320 which are connected to the middle connector 310 are rotated in opposite directions. Correspondingly, the middle connector is formed with two openings facing upward and leftward/rightward and two openings facing downward and frontward/backward, so as to make the bottom frame member 300 fold and unfold.

That is, one end portion of each first linkage 340 is rotatably connected to the middle connector 310. During the folding process, the other end portion of each first linkage 340 (the end portion not rotatably connected to the middle connector 310) is rotated upward relative to the middle connector 310 as an initial point, and thus one of the first linkages 340 is moved clockwise and the other of the first linkages 340 is moved counterclockwise. One end portion of each bottom frame transverse tube 320 is rotatably connected to the middle connector 310, and the other end portion of each bottom frame transverse tube 320 (the end portion not rotatably connected to the middle connector 310) is rotated downward relative to the middle connector 310 as an initial point. Therefore, one of the bottom frame transverse tubes 320 is rotated clockwise and the other is rotated counterclockwise. By this structure, the folded volume of the bottom frame member 300 can be effectively reduced, and the force transmission between various components is better, resulting in a better user experience during the folding operation.

One end portion of the first linkage 340 is rotatably connected to the linkage connector 330. During the folding process, the other end portion (the end portion not rotatably connected to the linkage connector 330) is rotated downward relative to the linkage connector 330 as an initial point. One end portion of the second tube 122 is rotatably connected to the linkage connector 330, and the other end portion (the end portion not rotatably connected to the linkage connector 330) is rotated downward relative to the linkage connector 330 as an initial point. It can be understood that when the first linkage 340 is moved clockwise relative to the linkage connector 330 as a center, the second linkage 350 is moved counterclockwise, and vice versa.

The bottom frame transverse tube 320 extends from a rotation joint with the middle bottom frame member 160 in a direction away from the middle connector 310, so as to make the end portion of the bottom frame transverse tube 320 abut against the middle bottom frame member 160.

A groove 1611 is formed in the middle bottom frame member 160, which is fitted to the end portion of the bottom frame transverse tube 320, so as to make the bottom frame transverse tube 320 abut against the middle bottom frame member 160.

The second folding assembly 120 includes a first tube 121 and a second tube 122. The first tube 121 and the second tube 122 are crossed and connected with each other. One end portion of the first tube 121 is rotatably connected to the side vertical tube 110 on one side, and the other end portion of the first tube 121 is movably connected to one end portion of the middle vertical tube 150 on the other side. One end portion of the second tube 122 is rotatably connected to the middle bottom frame member 160 on one side, and the other end portion of the second tube 122 is slidably connected to the side vertical tube 110. In this way, an upper movement limit of the end portion of each second folding assembly 120 can be kept not beyond the height of the side vertical tube 110 in z direction. When the second folding assembly 120 being arranged vertically after the frame being folded, the length of the second folding assembly 120 does not exceed the side vertical tube 110, thereby keeping the length in z direction after the frame being folded no greater than the initial length.

The side frame body 100 further includes a middle vertical tube 150, which is connected to the middle bottom frame member 160. The middle vertical tube 150 is slidably connected to a middle slider 170, which is rotatably connected to the first tube 121.

The side vertical tube 110 is slidably connected to a side slider 140, which is rotatably connected to the second tube 122. The first folding assembly 200 includes a third tube 210 and a fourth tube 220, which are crossed and connected with each other. One end portion of the third tube 210 is rotatably connected to the side vertical tube 110 on one side, and the other end portion of the third tube 210 is rotatably connected to the side slider 140 on the other side. One end portion of the fourth tube 220 is rotatably connected to the side slider 140 on one side, and the other end portion is rotatably connected to the side slider 140 on the other side.

A distance between two rotation joints at two ends of the first linkage 340 is defined as L1, a distance between the two rotation joints at two ends of the bottom frame transverse tube 320 is defined as L2, and a distance between the two rotation joints at two ends of the second linkage 350 is defined as L3, where a result of L1+L2−L3 ranges from −30 mm to +30 mm.

As shown in FIG. 1, the frame includes a front frame body 100*a*, a rear frame body 100*b*, and a bottom frame member 300. The front frame body 100*a* and the rear frame body 100*b*, which are arranged in parallel, are both connected to the first folding assemblies 200 at both left and right sides, respectively.

As shown in FIG. 1, taking the front frame body 100*a* as an example, the front frame body 100*a* extends in a left and right direction as a whole. The front frame body 100*a* includes two side vertical tubes 110 on left and right sides, respectively, and a middle vertical tube 150 between the two side vertical tubes 110. The lower side of the side vertical tube 110 is connected to the side bottom frame member 130, and the side slider 140 can slide up and down along the side vertical tube 110. The lower side of the middle vertical tube 150 is connected to the middle bottom frame member 160, and the middle slider 170 can slide up and down along the middle vertical tube 150.

As shown in FIG. 1, two sets of first folding assemblies 200 are connected between the front frame body 100*a* and the rear frame body 100*b*. The third tube 210 and the fourth tube 220 of each first folding assembly 200 are crossed and connected with each other, which are rotatably connected at the joint by a pin. The front end portion of the third tube 210 is rotatably connected to the side bottom frame member 130 on the front side, and the rear end portion is rotatably connected to the side sliding component 140 on the rear side. The front end portion of the fourth tube 220 is rotatably connected to the side sliding component 140 on the front side, and the rear end portion is rotatably connected to the side bottom frame member 130 on the rear side.

As shown in FIG. 1, the side frame body 100 includes two sets of second folding assemblies 120, which are arranged on left and right sides of the middle vertical tube 150, respectively. The second folding assembly 120 each includes a first tube 121 and a second tube 122 that have the same length and are crossed and connected with each other. The joint of the first tube 121 and the second tube 122 is connected by a pin. Taking the second folding assembly 120 on the left side of the front frame body 100*a* as an example, the left end portion of the first tube 121 is rotatably connected to the side bottom frame member 130, the right end portion is rotatably connected to the middle slider 170, the left end portion of the second tube 122 is rotatably connected to the side slider 140, and the right end portion is rotatably connected to the middle bottom frame member 160.

As shown in FIG. 1, the middle connector 310 is located in the middle of the bottom frame member 300, which is positioned at the middle line between the front frame body 100*a* and the rear frame body 10*b*. In an embodiment, the middle connector 310 is located at the center of the bottom frame member 300. One end portion of the bottom frame transverse tube 320 is rotatably connected to the middle connector 310, and the other end portion of the bottom frame transverse tube 320 is rotatably connected to the middle bottom frame member 160. The bottom frame transverse tube 320 extends in the frontward and backward direction and is perpendicular to a plane where the side frame body 100 is positioned. The middle connector 310 is provided with a linkage connector 330 in the direction towards the first folding assembly 200. One end portion of the first linkage 340 is connected to the middle connector 310, and the other end portion of the first linkage 340 is rotatably connected to the linkage connector 330. Taking the linkage connector 330 on the left side as an example, the left side of the tube connector 330 is connected to two second linkages 350 that are arranged at an angle with each other. The right end portion of each second linkage 350 is rotatably connected to the linkage connector 330, the left end portion of the second linkage 350 at the front side is rotatably connected to the side bottom frame member 130 of the left front end portion, and the left end portion of the second linkage 350 at rear side is rotatably connected to the side bottom frame member 130 at the left rear end portion.

Figure 2:
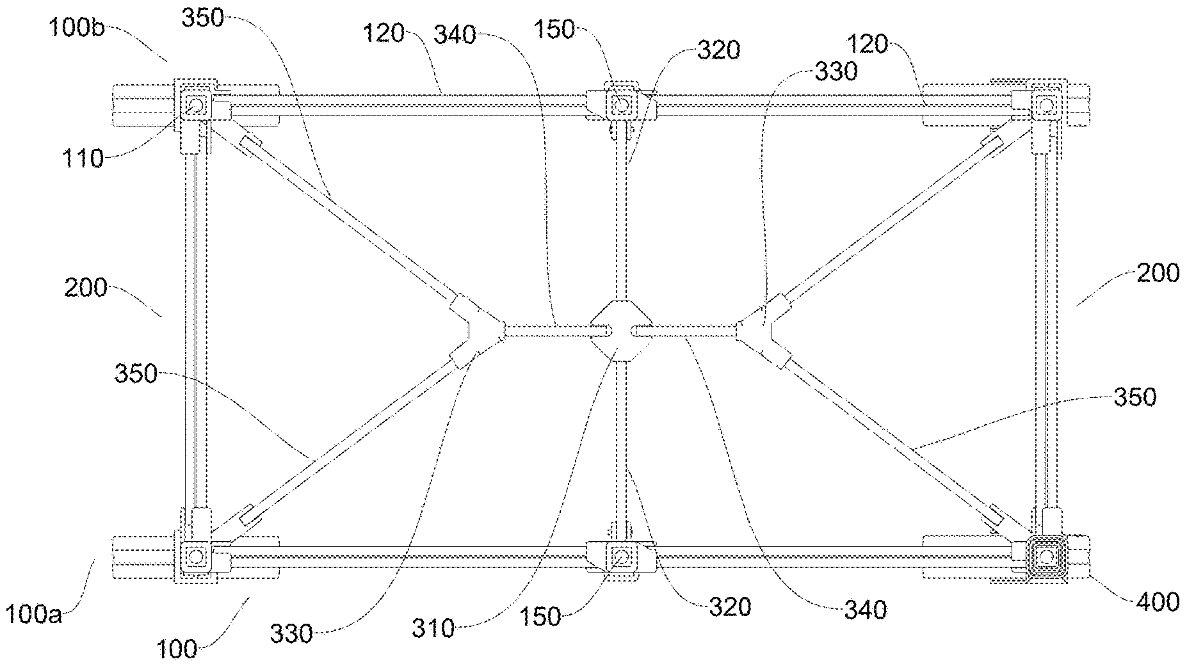
FIG. 2 is a top view of the present application.

As shown in FIG. 2, a plane where the front frame body 100*a* is positioned and a plane where the rear frame body 100*b* is positioned are parallel and planes where the first folding assemblies 200 on the left and right sides are positioned, respectively, are parallel to each other, and thus these planes form a cuboid frame. The extension line of the first linkage 340 of the bottom frame member 300 is perpendicular to the planes where the first folding assemblies 200 are positioned, and the first linkage 340 is arranged perpendicular to the bottom frame transverse tube 320. The first linkage 340 and the second linkage 350 are arranged in a Y-shape.

A distance between the two rotation joints at two ends of the first linkage 340 is defined as L1, a distance between the two rotation joints at two ends of the bottom frame transverse tube 320 is defined as L2, and a distance between the two rotation joints at two ends of the second linkage 350 is defined as L3, where a result of L1+L2−L3 ranges from −30 mm to +30 mm, in an embodiment, L1+L2=L3, and in some embodiments, the difference between L1+L2 and L3 may also be 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, and 30 mm.

As shown in FIG. 2, the middle connector 310 is located at the center of the cuboid frame. The bottom frame transverse tube 320 and the first linkage 340 are arranged in a cross shape and are rotatably connected to the middle connector 310, respectively. One end portion of the second linkage 350 is rotatably connected to the side bottom frame member 130. That is, the bottom frame member 300 is connected to the side vertical tubes 110 at the four corners of the frame, respectively, and is further directly rotatably connected to the middle portion of the long side, which achieves a direct connection at each joint of the frame. With the cooperation of the central vertical tube, the stability of the whole frame is better and the load capacity is greater with a good folding effect.

Figure 3:
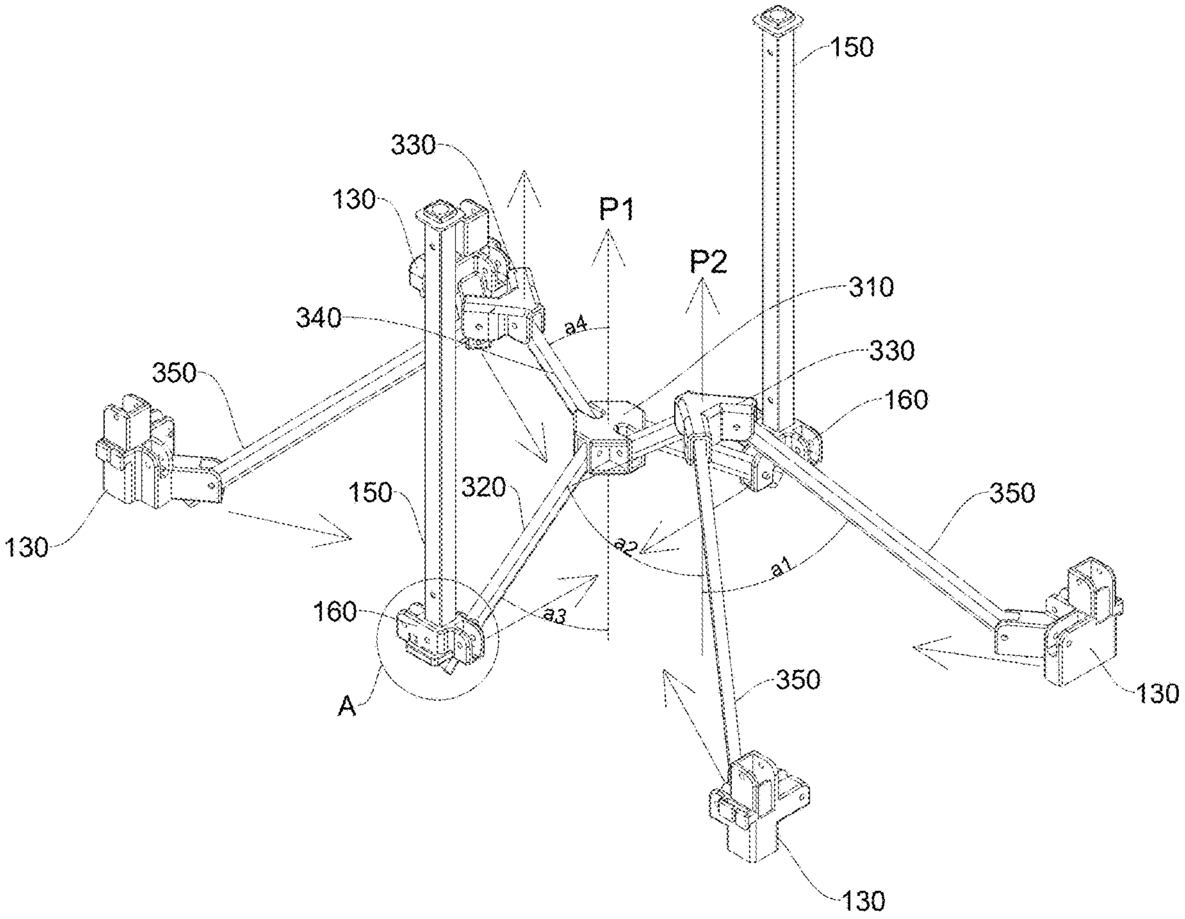
FIG. 3 is an axonometrical view of a bottom frame member of the present application in process of folding.

As shown in FIG. 3, two end portions of each of the bottom frame transverse tube 320, the first linkage 340, and the second linkage 350 are both rotating connection end. The two end portions of the bottom frame transverse tube 320 are rotatably connected to the middle bottom frame member 160 and the middle connection member 310, respectively. The two end portions of the first linkage 340 are rotatably connected to the middle connection member 310 and the linkage connection member 330, respectively. The two end portions of the second linkage 350 are rotatably connected to the side bottom frame member 130 and the linkage connection member 330, respectively. When being folded, the linkage connector 330 and the middle connector 310 are moved upward relatively, and the side bottom frame member 130 is moved towards an initial position of the middle connection member 310 along a diagonal direction of the frame as a motion path. The middle bottom frame member 160 is moved towards the initial position of the middle connection member 310.

As shown in FIG. 3, during the folding process, the linkage connector 330 moves upward, which drives the rotation joints of the first linkage 340, the second linkage 350, and the middle connector 310 to move upward. As such, the end portion of the first linkage 340 connected to the middle connector 310 is rotated downward relative to the connector 330 of the linkage. Similarly, the end portion of the second linkage 350 connected to the side bottom frame member 130 is rotated downward relative to the linkage connector 330.

As shown in FIG. 3, P2 is a relative perpendicular line along which the linkage connector 330 is moved up and down, and P2 is divided into an upper section and a lower section by the linkage connector 330 as a boundary. a1 is an included angle between the second linkage 350 and the lower section of P2, and a2 is an included angle between the first linkage 340 and the lower section of P2. During the folding process, a1 and a2 are gradually decreased from 90°.

As shown in FIG. 3, the linkage connector 330 is moved upward to drive the first linkage 340 to rotate, and thus is rotated through the rotation of the first linkage 340 to drive the middle connector 310 to move upward. Similarly, the second linkage 350 and the bottom frame vertical tube drive the side bottom frame member 130 and the middle bottom frame member 160 to move towards the center. The linkage connector 330 is moved antecedent to the middle connector 310. Therefore, taking the middle connector 310 as a reference, the end portion of the first linkage 340 connected to the linkage connector 330 is rotated upward relative to the middle connector 310. Similarly, the end portion of the bottom frame transverse tube 320 connected to the middle bottom frame member 160 is rotated downward relative to the middle connector 310.

As shown in FIG. 3, P1 is a relative perpendicular line along which the middle connector 310 is moved up and down, and P1 is divided into an upper section and a lower section by the middle connector 310 as a boundary. a3 is an included angle between the bottom frame transverse tube 320 and the lower section of P1, and a4 is an included angle between the first linkage 340 and the upper section of P1. During the folding process, a3 and a4 are gradually decreased from 90°. By this cooperation and connection way, the space and the structure can be effectively utilized to achieve a good support, an excellent co-movement during folding, and a good spatial performance after being folded.

Figure 4:
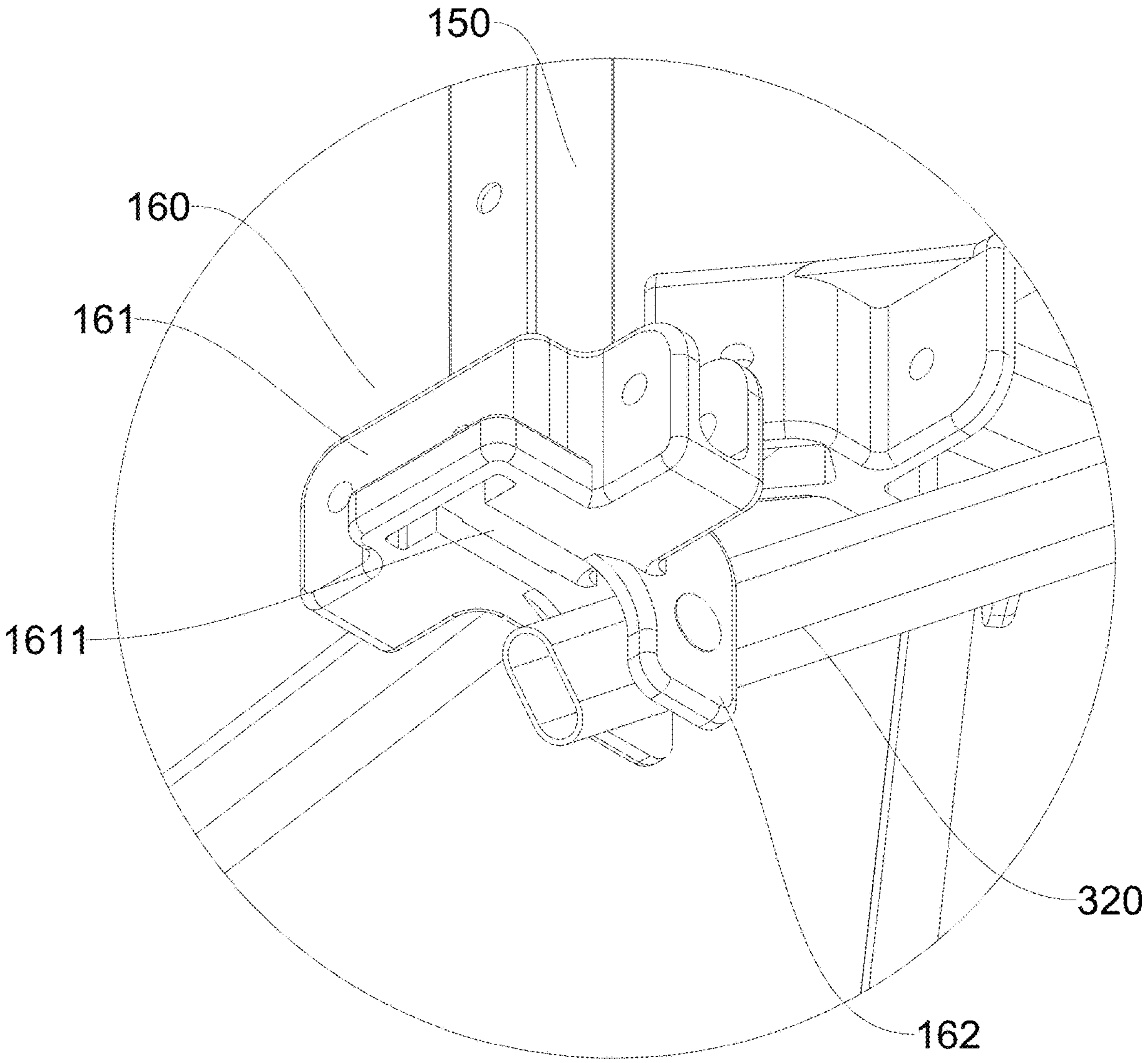
FIG. 4 is a schematic bottom structural view at A in FIG. 3.
Figure 5:
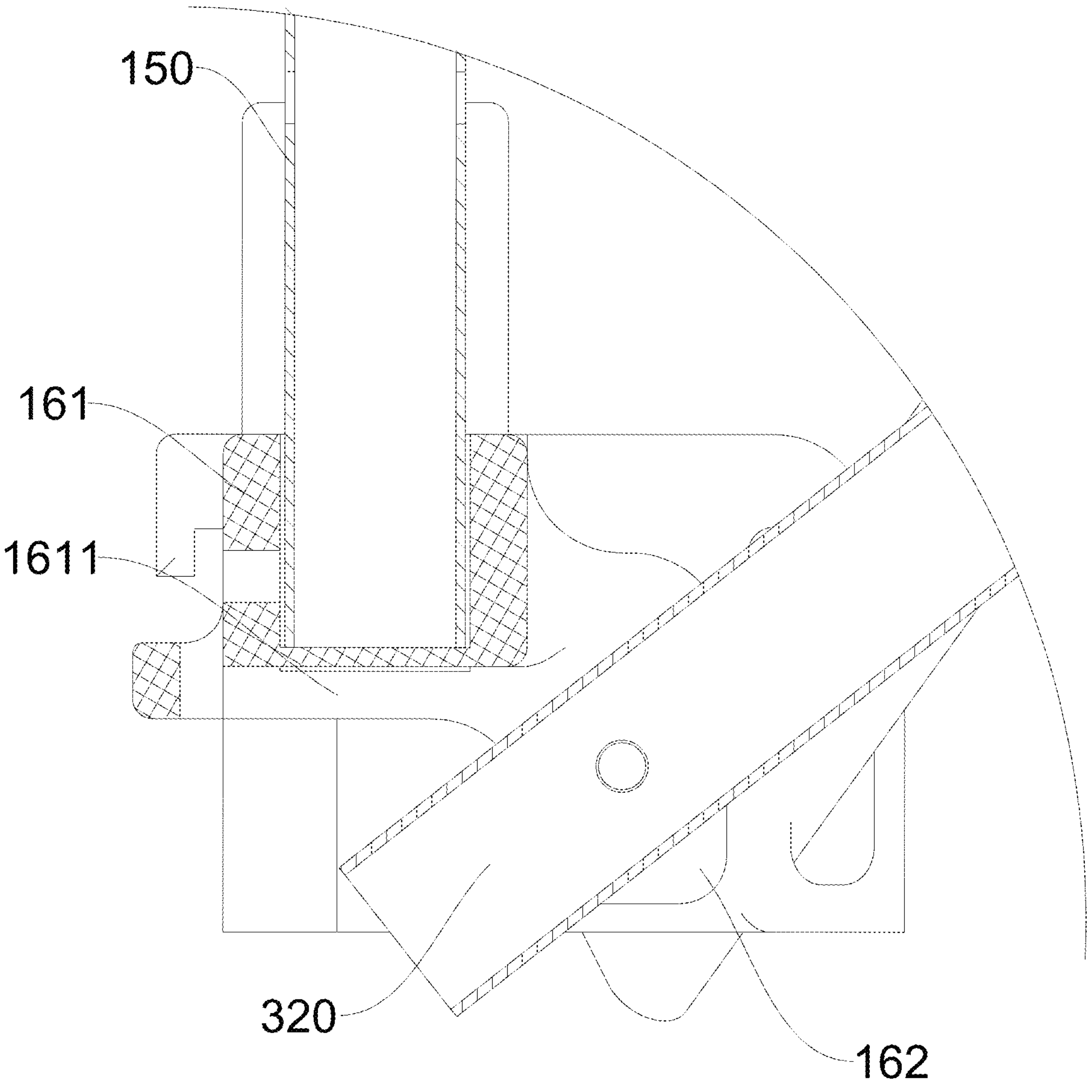
FIG. 5 is a cross-sectional view at A in FIG. 3.

As shown in FIG. 4, the middle bottom frame member 160 includes a fixation portion 161, and two lugs 162 that extend downward are formed on an inner side of the fixation portion 161 (the side facing the middle connecting member 310). The bottom frame transverse tube 320 is located between the two lugs 162 and is rotatably connected by a pin. Referring to FIG. 5, the rotation joint between the lugs 162 and the bottom frame transverse tube 320 is located on the lower side of the fixation portion 161. An end portion of the bottom frame transverse tube 320, which is rotatably connected to the lugs 162, extends toward an outer side of the fixation portion 161 (the side away from the middle connecting member 310). The extension length accounts for one-third of the length of the lower side of the fixation portion 161, and in some embodiments, this proportion may also be ¼, ½, ⅔, and thus, in case that the bottom frame transverse tube 320 is positioned horizontally or at an angle within 5 degrees relative to the horizontal, the end portion of the bottom frame transverse tube 320 can abut against the lower side of the positioning part, which forms a clamping connection between the bottom frame transverse tube 320 and the middle bottom frame member 160, thereby enhancing the stability of the whole frame.

Referring to FIG. 4 and FIG. 5, a groove 1611 is formed on the lower side of the fixation portion 161, which extends in a direction of the second linkage 350. The length of the groove 1611 is longer than that of the end portion of the bottom frame transverse tube 320 by 3 mm to 5 mm.

Figure 6:
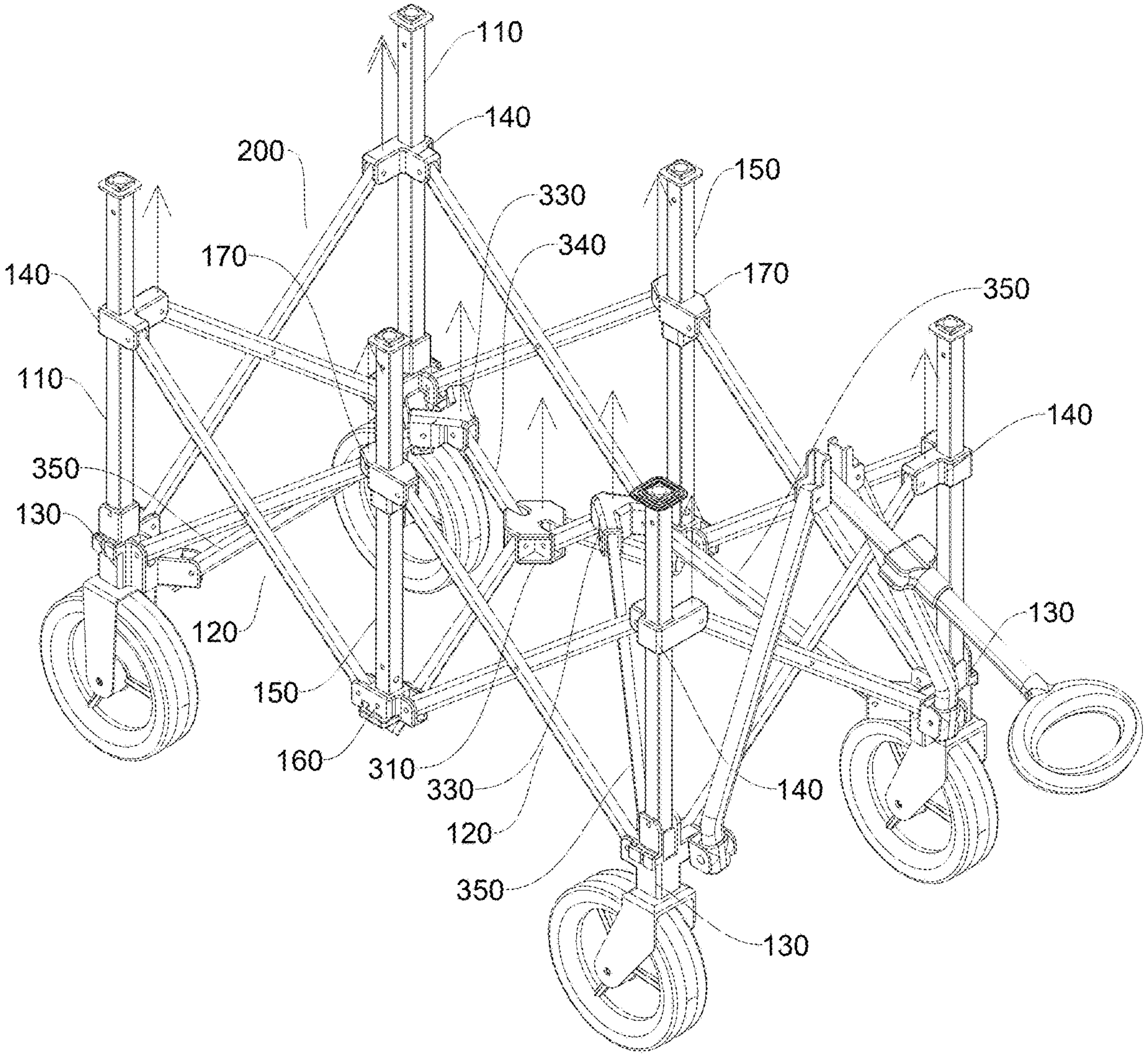
FIG. 6 is an axonometrical view of the present application in process of folding.

As shown in FIG. 6, during the folding process, the user moves two linkage connectors 330 upwards, and then the linkage connectors 330 drive the middle connector 310 upwards by the first linkage 340 and the angles of the second linkages 350 change, which drives the side bottom frame members 130 and the side vertical tubes 110 to move towards the center. The middle connector 310 drives the middle vertical tubes 150 to move towards the center through the bottom frame transverse tubes 320. That is, the bottom frame member 300 drives the side vertical tubes 110 and the middle vertical tubes 150 to move simultaneously.

Figure 7:
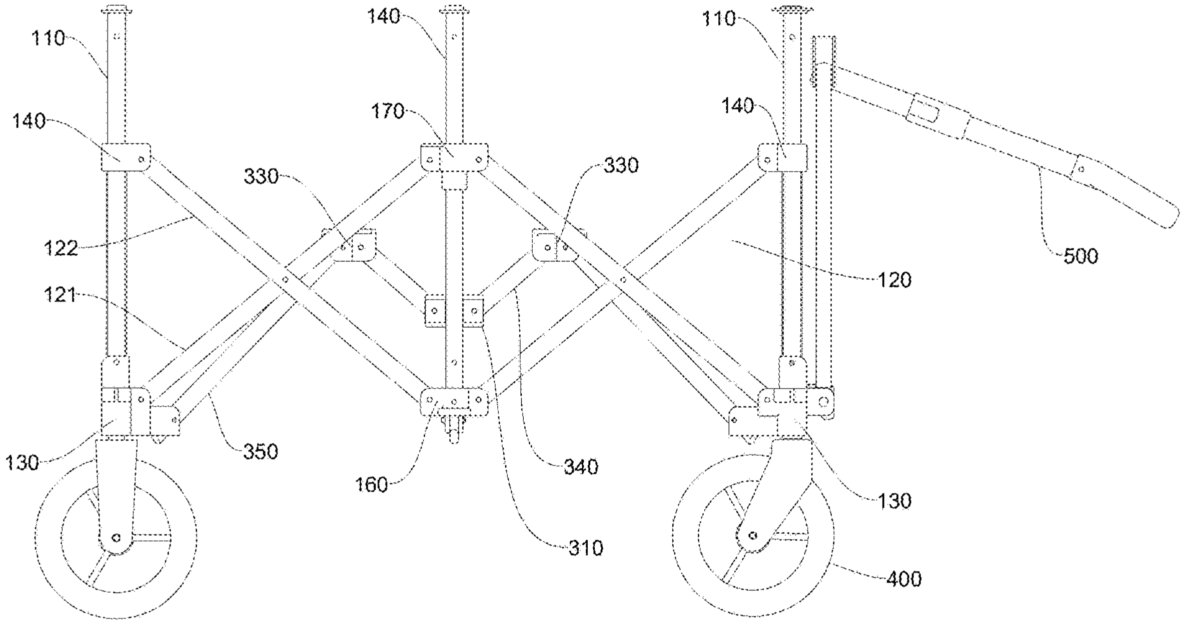
FIG. 7 is a front view of the present application in process of folding.

As shown in FIG. 7, through the cooperation of the first folding assembly 200 and the second folding assembly 120, during the folding process, the side bottom frame member 130 and the middle bottom frame member 160 are substantially on the same plane. That is, a relative position of the side bottom frame member 130 and the middle bottom frame member 160 in z direction does not change during the folding process, after the frame being folded, and in the unfolded state, which is beneficial to be stored after the frame is folded. Meanwhile, the structural form of the bottom frame member 300 allows the side frame body 100 to achieve a good folding effect even without the middle vertical tube 150. On the other hand, the overall structural strength of the frame is enhanced if the middle vertical tube 150 is added.

Figure 8:
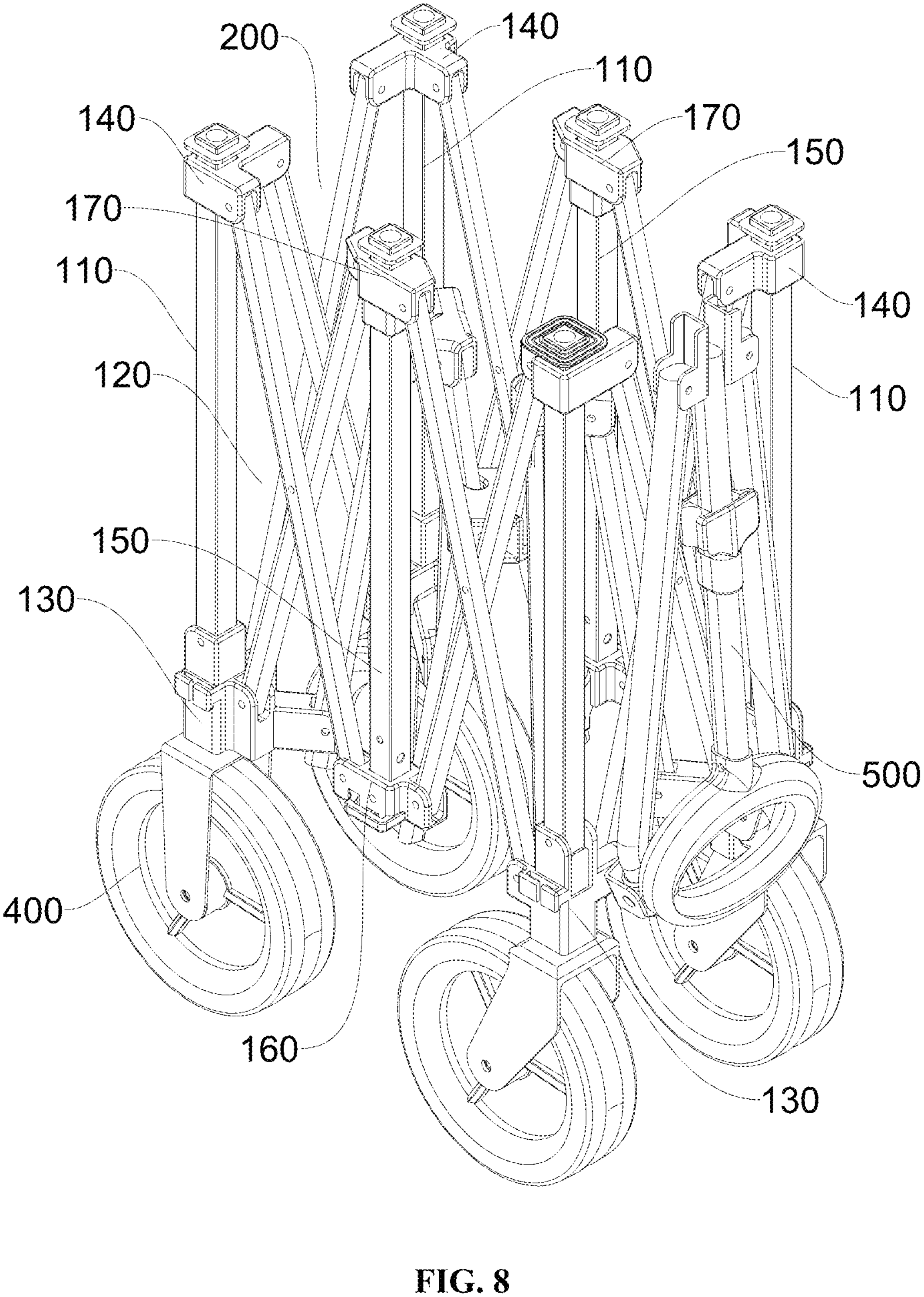
FIG. 8 is an axonometrical view of the present application after being folded.

As shown in FIG. 8, after the frame being folded, the overall length of the frame is not greater than the length of the side vertical tube 110 and the middle vertical tube 150 in z direction. After the second linkages 350 and the first linkage 340 of the bottom frame member 300 are folded, the frame is folded by multiple sections in different directions in x direction, so that the total length of the bottom frame member 300 in z direction after the frame being folded does not exceed the side vertical tube 110, which facilitates storage.

As shown in FIG. 1, a cart is provided, where wheels 400 are installed on the lower side of the side bottom frame member 130 of the frame and are detachably connected to the side bottom frame member 130 and a handle 500 is rotatably installed on the right side of the frame, and thus a cart is obtained.

It should be understood that the embodiments described in the present application are illustrative rather than limited. Therefore, the present application is not limited to the examples described in the specific embodiments. Other embodiments obtained by those skilled in the art based on the technical solution of the present application also fall within the scope of the present application.

What is claimed is:

1. A frame, comprising side frame bodies that are arranged in opposite, wherein a first folding assembly is connected between the side frame bodies, the side frame bodies each includes side vertical tubes that are arranged in opposite, and a second folding assembly is connected between the side vertical tubes, wherein the frame further comprises a bottom frame member, comprising:

a middle connector, which is connected to bottom frame transverse tubes in a direction of the side frame bodies, one end portion of each bottom frame transverse tube is rotatably connected to the middle connector, and the other end portion is rotatably connected to a corresponding one of the side frame bodies;

a linkage connector, which is located in a direction from the middle connector towards the first folding assembly;

a first linkage, one end portion of the first linkage is rotatably connected to the middle connector and the other end portion of the first linkage is connected to the linkage connector; and second linkages that are arranged at an angle with each other, one end portion of each second linkage is rotatably connected to the linkage connectors and the other end portion of each second linkage is rotatably connected to a corresponding one of the side vertical tubes.

2. The frame according to claim 1, wherein each side frame body comprises a middle bottom frame member, and two opposite sides of the middle bottom frame member are each rotatably connected to the second folding assembly, wherein the bottom frame transverse tubes are rotatably connected to the middle bottom frame member.

3. The frame according to claim 2, wherein the bottom frame transverse tubes each extends from a rotation joint with the middle bottom frame member in a direction away from the middle connector, so that one end portion of each bottom frame transverse tube is allowed to abut against the middle bottom frame member.

4. The frame according to claim 2, wherein the second folding assembly comprises a first tube and a second tube, which are crossed and connected with each other, one end portion of the first tube is rotatably connected to a corresponding one of the side vertical tubes on one side, and the other end portion of the first tube is movably connected to one end portion of a middle vertical tube on the other side, wherein one end portion of the second tube is rotatably connected to the middle bottom frame member on the one side, and the other end portion of the second tube is slidably connected to the corresponding one of the side vertical tubes.

5. A cart, comprising the frame according to claim 2, wherein wheels are provided on a lower side of the frame.

6. The frame according to claim 1, wherein the second linkages and the first linkage which are connected to the linkage connector are rotated in a same direction and the first linkage and the bottom frame transverse tubes which are connected to the middle connector are rotated in an opposite direction, so as to make the bottom frame member fold and unfold.

7. The frame according to claim 6, wherein a distance between two rotation joints at two ends of each first linkage is defined as L1, a distance between two rotation joints at two ends of each bottom frame transverse tube is defined as L2, and a distance between two rotation joints at two ends of each second linkage is defined as L3, wherein a result of L1+L2−L3 ranges from −30 mm to +30 mm.

8. The frame according to claim 6, wherein the bottom frame transverse tubes each extends from a rotation joint with the middle bottom frame member in a direction away from the middle connector, so that one end portion of each bottom frame transverse tube is allowed to abut against the middle bottom frame member.

9. The frame according to claim 6, wherein the second folding assembly comprises a first tube and a second tube, which are crossed and connected with each other, one end portion of the first tube is rotatably connected to a corresponding one of the side vertical tubes on one side, and the other end portion of the first tube is movably connected to one end portion of a middle vertical tube on the other side, wherein one end portion of the second tube is rotatably connected to the middle bottom frame member on the one side, and the other end portion of the second tube is slidably connected to the corresponding one of the side vertical tubes.

10. A cart, comprising the frame according to claim 6, wherein wheels are provided on a lower side of the frame.

11. The frame according to claim 1, wherein the bottom frame transverse tubes each extends from a rotation joint with the middle bottom frame member in a direction away from the middle connector, so that one end portion of each bottom frame transverse tube is allowed to abut against the middle bottom frame member.

12. The frame according to claim 11, wherein a groove is formed in the middle bottom frame member, which is fitted to an end portion of each bottom frame transverse tube, so that each bottom frame transverse tube is allowed to abut against the middle bottom frame member.

13. A cart, comprising the frame according to claim 12, wherein wheels are provided on a lower side of the frame.

14. A cart, comprising the frame according to claim 11, wherein wheels are provided on a lower side of the frame.

15. The frame according to claim 1, wherein the second folding assembly comprises a first tube and a second tube, which are crossed and connected with each other, one end portion of the first tube is rotatably connected to a corresponding one of the side vertical tubes on one side, and the other end portion of the first tube is movably connected to one end portion of a middle vertical tube on the other side, wherein one end portion of the second tube is rotatably connected to the middle bottom frame member on the one side, and the other end portion of the second tube is slidably connected to the corresponding one of the side vertical tubes.

16. The frame according to claim 15, wherein each side frame body further comprises the middle vertical tubes, each of which is connected to the middle bottom frame member, and middle sliders are provided to be slidably connected to the middle vertical tubes, wherein the middle sliders are rotatably connected to the first tubes, respectively.

17. A cart, comprising the frame according to claim 16, wherein wheels are provided on a lower side of the frame.

18. The frame according to claim 15, wherein the side vertical tubes are slidably connected to side sliders, respectively, each side slider is rotatably connected to the second tube, the first folding assembly comprises a third tube and a fourth tube, which are crossed and connected with each other, one end portion of the third tube is rotatably connected to a corresponding one of the side vertical tubes on one side, and the other end portion of the third tube is rotatably connected to a corresponding one of the side sliders on the other side, one end portion of the fourth tube is rotatably connected to a corresponding one of the side sliders on the one side, and the other end portion is rotatably connected to a corresponding one of the side slider on the other side.

19. A cart, comprising the frame according to claim 15, wherein wheels are provided on a lower side of the frame.

20. A cart, comprising the frame according to claim 1, wherein wheels are provided on a lower side of the frame.

* * * * *